(12) United States Patent
Kim

(10) Patent No.: US 9,122,041 B2
(45) Date of Patent: Sep. 1, 2015

(54) ZOOM LENS AND PHOTOGRAPHING APPARATUS INCLUDING THE SAME

(75) Inventor: Jin-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 13/419,742

(22) Filed: Mar. 14, 2012

(65) Prior Publication Data

US 2013/0057747 A1 Mar. 7, 2013

(30) Foreign Application Priority Data

Sep. 2, 2011 (KR) .................. 10-2011-0089255

(51) Int. Cl.
| | | |
|---|---|---|
| *G02B 15/14* | (2006.01) | |
| *G02B 27/64* | (2006.01) | |
| *G02B 15/22* | (2006.01) | |
| *H04N 5/225* | (2006.01) | |
| *G02B 15/177* | (2006.01) | |

(52) U.S. Cl.
CPC .............. *G02B 15/14* (2013.01); *G02B 15/177* (2013.01); *G02B 15/22* (2013.01); *G02B 27/646* (2013.01); *H04N 5/225* (2013.01)

(58) Field of Classification Search
CPC ........ G02B 15/00; G02B 15/14; G02B 15/15; G02B 15/16; G02B 15/163; G02B 15/177; G02B 15/20
USPC .......................... 359/577, 554, 557, 676–690
See application file for complete search history.

(56) References Cited

U.S. PATENT DOCUMENTS

| | | | | |
|---|---|---|---|---|
| 7,092,170 | B2 * | 8/2006 | Satori ........................... | 359/689 |
| 7,339,747 | B2 * | 3/2008 | Yamamoto et al. ........... | 359/686 |
| 7,486,448 | B2 * | 2/2009 | Iwama .......................... | 359/689 |
| 7,551,367 | B2 * | 6/2009 | Harada ......................... | 359/689 |
| 7,961,405 | B2 * | 6/2011 | Ito ................................. | 359/689 |
| 2007/0201144 | A1 | 8/2007 | Sudoh | |
| 2008/0297915 | A1 | 12/2008 | Yamada et al. | |
| 2010/0091381 | A1 * | 4/2010 | Katakura ...................... | 359/676 |
| 2010/0149657 | A1 * | 6/2010 | Kuroda ......................... | 359/689 |
| 2010/0254023 | A1 | 10/2010 | Ito | |
| 2010/0277810 | A1 * | 11/2010 | Shyu ............................. | 359/682 |
| 2013/0135752 | A1 * | 5/2013 | Huang et al. ................. | 359/689 |

FOREIGN PATENT DOCUMENTS

| | | |
|---|---|---|
| JP | 06-094996 A | 4/1994 |
| JP | 08-068939 A | 3/1996 |

(Continued)

*Primary Examiner* — Thong Nguyen
(74) *Attorney, Agent, or Firm* — Drinker Biddle & Reath LLP

(57) ABSTRACT

A zoom lens and a photographing apparatus including the zoom lens that includes a first lens group having a negative refractive power, a second lens group having a positive refractive power, and a third lens group having a positive refractive power that are sequentially arranged from an object side; during zooming from wide to telephoto, the distance between the first and second lens groups decreases and the distance between the second and third lens groups increases; the first lens group includes a first lens having a negative refractive power and is a double-concave lens and a second lens having a positive refractive power that are sequentially arranged from the object side; and the second lens group includes a third lens having a positive refractive power, being disposed closest to the image side, and is a meniscus lens having a concave surface toward the object side.

20 Claims, 13 Drawing Sheets

(56) References Cited

FOREIGN PATENT DOCUMENTS

| | | |
|---|---|---|
| JP | 09-021950 A | 1/1997 |
| JP | 11-095103 A | 4/1999 |
| JP | 2000-131612 A | 5/1999 |
| JP | 11-149044 A | 6/1999 |
| JP | 11-174322 A | 7/1999 |
| JP | 11-194274 A | 7/1999 |
| JP | 11-287953 A | 10/1999 |
| JP | 2001-042218 A | 2/2001 |
| JP | 2001-208969 A | 8/2001 |
| JP | 2001-318311 A | 11/2001 |
| JP | 2002-023053 A | 1/2002 |
| JP | 2002-090625 A | 3/2002 |
| JP | 2002-267930 A | 9/2002 |
| JP | 2002-277740 A | 9/2002 |
| JP | 2003-005072 A | 1/2003 |
| JP | 2003-015035 A | 1/2003 |
| JP | 2003-043359 A | 2/2003 |
| JP | 2003-107348 A | 4/2003 |
| JP | 2003-107349 A | 4/2003 |
| JP | 2003-107352 A | 4/2003 |
| JP | 2003-131129 A | 5/2003 |
| JP | 2003-131134 A | 5/2003 |
| JP | 2003-140042 A | 5/2003 |
| JP | 2003-287679 A | 10/2003 |
| JP | 2004-013130 A | 1/2004 |
| JP | 2004-013169 A | 1/2004 |
| JP | 2004-070133 A | 3/2004 |
| JP | 2004-102313 A | 4/2004 |
| JP | 2004-144947 A | 5/2004 |
| JP | 2004-157195 A | 6/2004 |
| JP | 2004-191599 A | 7/2004 |
| JP | 2004-239973 A | 8/2004 |
| JP | 2004-239974 A | 8/2004 |
| JP | 2004-258516 A | 9/2004 |
| JP | 2004-318105 A | 11/2004 |
| JP | 2004-354916 A | 12/2004 |
| JP | 2005-037727 A | 2/2005 |
| JP | 2005-062227 A | 3/2005 |
| JP | 2005-070697 A | 3/2005 |
| JP | 2005-099091 A | 4/2005 |
| JP | 2005-099092 A | 4/2005 |
| JP | 2005-292348 A | 10/2005 |
| JP | 2006-010895 A | 1/2006 |
| JP | 2006-065034 A | 3/2006 |
| JP | 2006-113554 A | 4/2006 |
| JP | 2006-126418 A | 5/2006 |
| JP | 2006-126806 A | 5/2006 |
| JP | 2006-139187 A | 6/2006 |
| JP | 2006-154172 A | 6/2006 |
| JP | 2006-184763 A | 7/2006 |
| JP | 2006-208890 A | 8/2006 |
| JP | 2006-227451 A | 8/2006 |
| JP | 2006-276897 A | 10/2006 |
| JP | 2006-284764 A | 10/2006 |
| JP | 2006-301393 A | 11/2006 |
| JP | 2006-350027 A | 12/2006 |
| JP | 2007-003873 A | 1/2007 |
| JP | 2007-011167 A | 1/2007 |
| JP | 2007-102182 A | 4/2007 |
| JP | 2007-108531 A | 4/2007 |
| JP | 2007-187737 A | 7/2007 |
| JP | 2007-232918 A | 9/2007 |
| JP | 2007-232997 A | 9/2007 |
| JP | 2007-316280 A | 12/2007 |
| JP | 2007-327991 A | 12/2007 |
| JP | 2008-046529 A | 2/2008 |
| JP | 2008-076584 A | 4/2008 |
| JP | 2008-165143 A | 7/2008 |
| JP | 2008-298892 A | 12/2008 |
| JP | 2008-298898 A | 12/2008 |
| JP | 2010-243637 A | 10/2010 |
| JP | 2011-017848 A | 1/2011 |
| JP | 2011-033770 A | 2/2011 |
| JP | 2011-039184 A | 2/2011 |

* cited by examiner (WIDE ANGLE END)

(MIDDLE END)

(TELEPHOTO END)

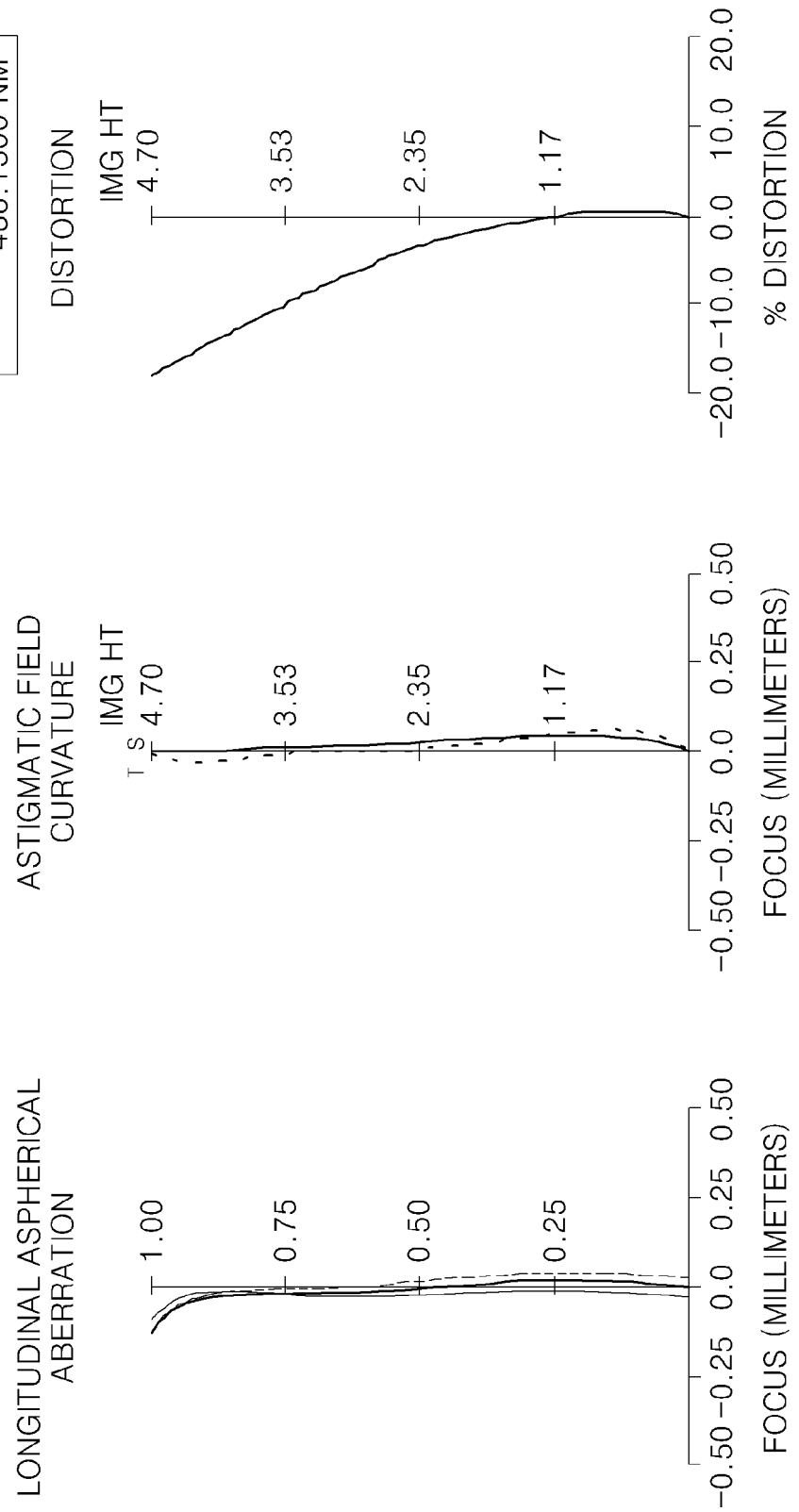

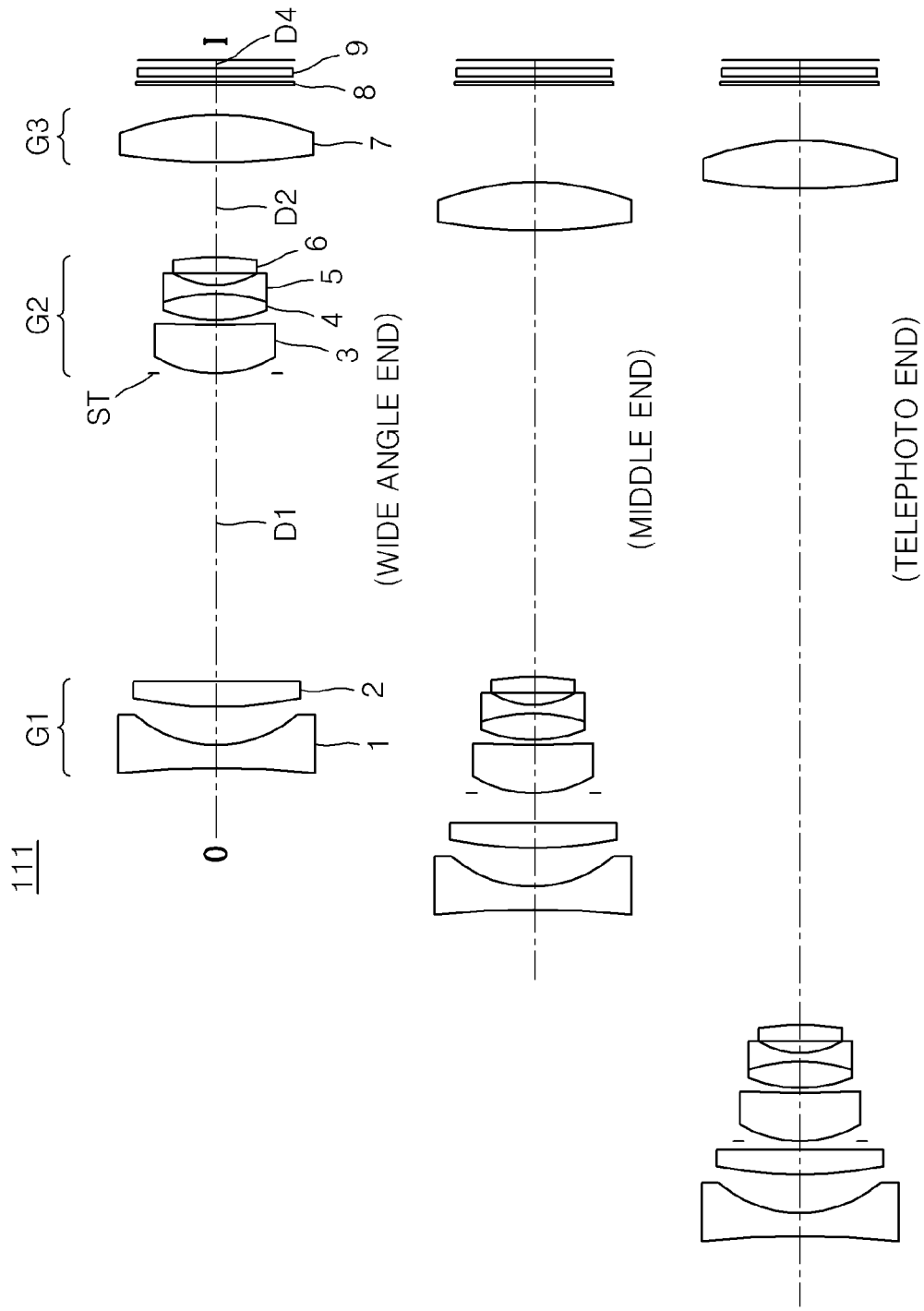

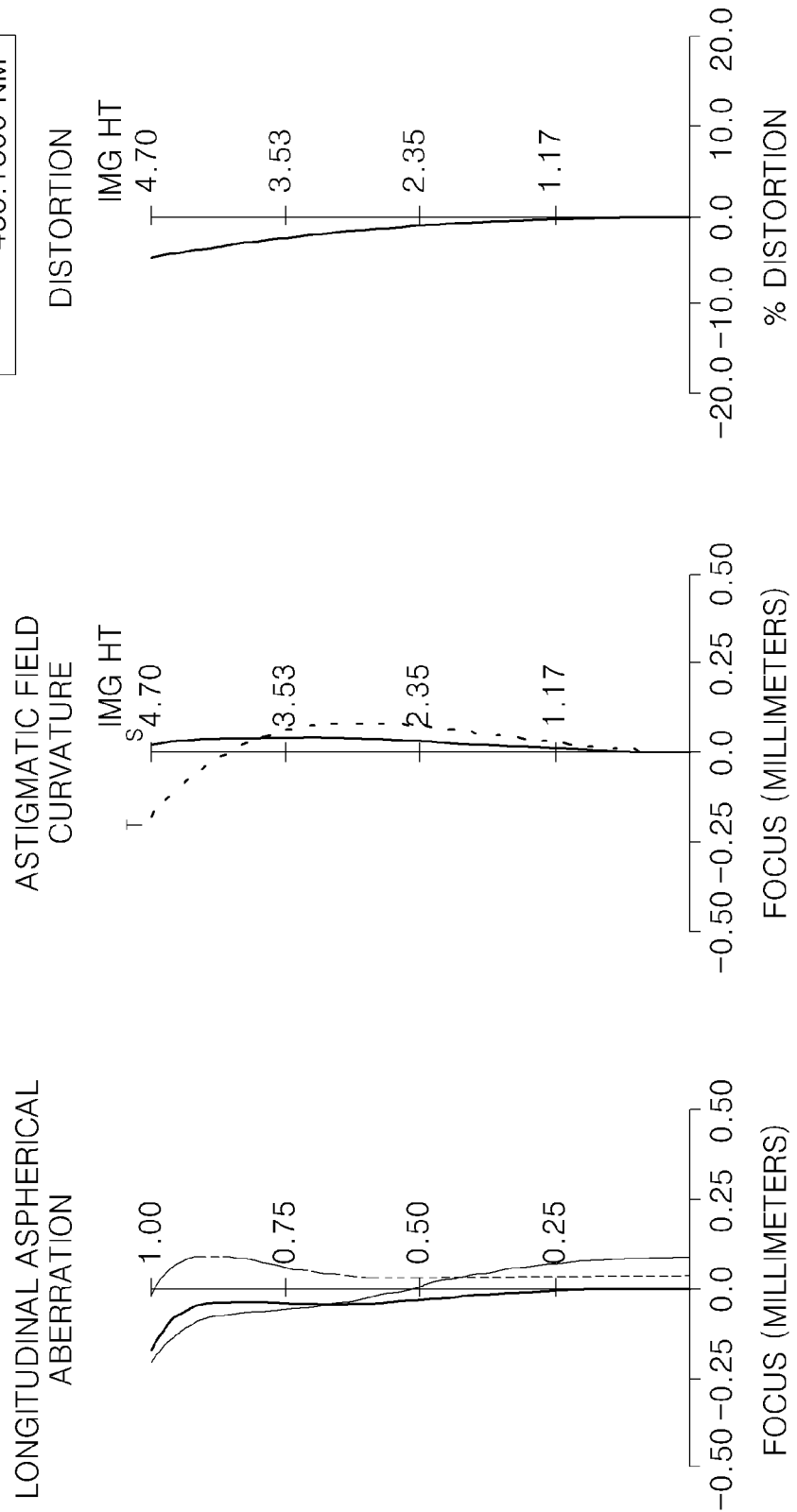

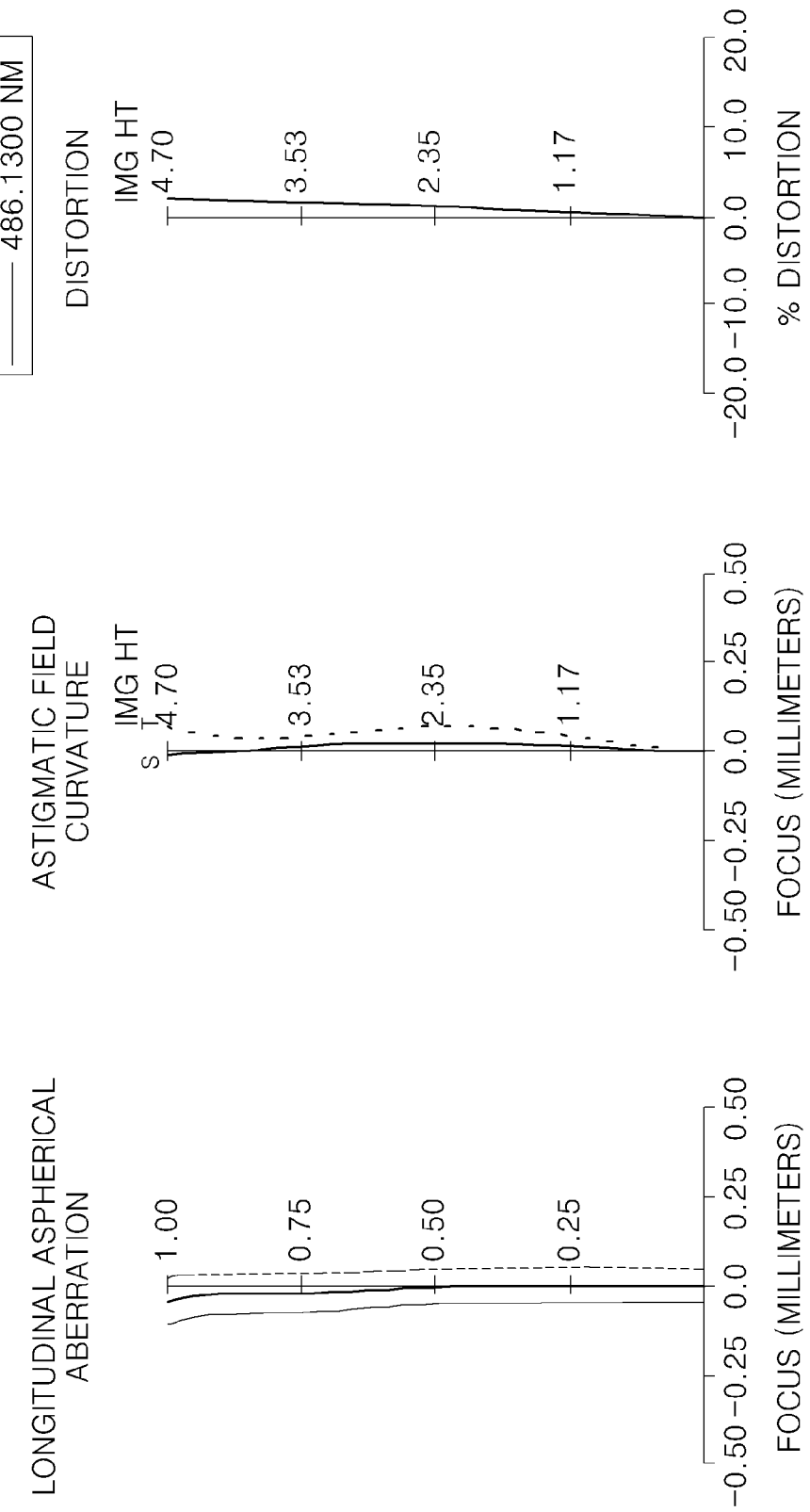

ZOOM LENS AND PHOTOGRAPHING APPARATUS INCLUDING THE SAME

CROSS-REFERENCE TO RELATED PATENT APPLICATION

This application claims the priority benefit of Korean Patent Application No. 10-2011-0089255, filed on Sep. 2, 2011, in the Korean Intellectual Property Office, the entirety of which is incorporated herein by reference.

BACKGROUND

1. Field

The invention relates to a zoom lens having a small-size and a high zooming magnification, and a photographing apparatus including the zoom lens.

2. Description of the Related Art

Recently, a zoom lens that is used in photographing apparatuses including digital cameras, digital camcorders, or the like having an imaging device such as a charge coupled device (CCD) or a complementary metal-oxide semiconductor (CMOS) is required to have a small-size and to have an optical system with high magnification. However, it is difficult to realize high magnification while maintaining the small-size, or it is difficult to have the small-size while realizing the high magnification. In this manner, it is difficult to simultaneously achieve the small-size, a high optical performance, and the high magnification.

SUMMARY

The invention provides a zoom lens having a small-size and high magnification.

The invention also provides a photographing apparatus including a zoom lens having a small-size and high magnification.

According to an embodiment, there is provided a zoom lens including a first lens group having a negative refractive power, a second lens group having a positive refractive power, and a third lens group having a positive refractive power that are sequentially arranged from an object side, wherein during zooming from a wide angle position to a telephoto position, the distance between the first lens group and the second lens group decreases and the distance between the second lens group and the third lens group increases, wherein the first lens group includes a first lens having a negative refractive power and being a double-concave lens and a second lens having a positive refractive power that are sequentially arranged from the object side, wherein the second lens group includes a third an image-side lens having a positive refractive power, being disposed closest to an image side, and being a meniscus lens having a concave surface toward the object side, and wherein the zoom lens satisfies the following Equations:

$$60 \le 3Vd \le 100$$

$$1.8 \le |f1|/fw \le 3$$

$$1 < (Ra+Rb)/(Ra-Rb) < 1$$

where, 3Vd indicates an Abbe's number of a lens included in the third lens group, f1 indicates the focal length of the first lens group, fw indicates the focal length of the zoom lens at the wide angle position, Ra indicates the radius of curvature of the object side of the first lens, and Rb indicates the radius of curvature of the image side of the second lens.

The zoom lens may satisfy the following Equation:

$$3 \le f3/fw \le 6$$

where, f3 indicates the focal length of the third lens group, and fw indicates the focal length of the zoom lens at the wide angle position.

The refractive index of the second lens of the first lens group may satisfy the following Equation:

$$1.9 \le 1Nd \le 2.099$$

where, 1 Nd indicates the refractive index of the second lens of the first lens group.

The zoom lens may satisfy the following Equation:

$$3 \le ft/fw \le 8$$

where, fw indicates the focal length of the zoom lens at the wide angle position, and ft indicates the focal length of the zoom lens at the telephoto position.

The second lens group may include a meniscus type aspherical lens having a convex surface toward the object side.

The meniscus type aspherical lens that has the convex surface toward the object side may have a positive refractive power.

The second lens group may include a doublet lens.

The doublet lens may include a positive lens and a negative lens that are sequentially arranged from the object side.

The third lens group may include an aspherical lens.

The second lens group may perform hand-shaking correction.

The second lens group may include an aperture disposed closest to the image side.

The second lens group may include an aperture disposed closest to the object side.

The aperture may move together with the second lens group during zooming.

The second lens group may include a third lens having a positive refractive power, a fourth lens having a positive refractive power, and a fifth lens having a negative refractive power that are arranged at the object side of the image-side lens.

The third lens group may perform focusing.

According to an embodiment, there is provided a photographing apparatus including a zoom lens; and an imaging device for converting an image formed by the zoom lens into an electrical image signal, wherein the zoom lens includes a first lens group having a negative refractive power, a second lens group having a positive refractive power, and a third lens group having a positive refractive power that are sequentially arranged from an object side, wherein during zooming from a wide angle position to a telephoto position, the distance between the first lens group and the second lens group decreases and the distance between the second lens group and the third lens group increases, wherein the first lens group includes a first lens having a negative refractive power and being a double-concave lens and a second lens having a positive refractive power that are sequentially arranged from the object side, wherein the second lens group includes a an image-side lens having a positive refractive power, being disposed closest to an image side, and being a meniscus lens having a concave surface toward the object side, and wherein the photographing apparatus satisfies the following Equations:

$$60 \le 3Vd \le 100$$

$$1.8 \le |f1|/fw \le 3$$

$$-1 < (Ra+Rb)/Ra-Rb) < 1$$

where, 3Vd indicates an Abbe's number of a lens included in the third lens group, f1 indicates the focal length of the first lens group, fw indicates the focal length of the zoom lens at the wide angle position, Ra indicates the radius of curvature of the object side of the first lens, and Rb indicates the radius of curvature of the image side of the second lens.

BRIEF DESCRIPTION OF THE DRAWINGS

The above and other features and advantages of the invention will become more apparent by describing in detail exemplary embodiments thereof with reference to the attached drawings in which:

FIGS. 2A and 2B illustrate aberrations at the wide angle position and the telephoto position of the zoom lens according to the first embodiment;

FIG. 3 illustrates a zoom lens at each of a wide angle position, a middle position, and a telephoto position according to a second embodiment;

FIGS. 4A and 4B illustrate aberrations at the wide angle position and the telephoto position of the zoom lens according to the second embodiment;

FIGS. 6A and 6B illustrate aberrations at the wide angle position and the telephoto position of the zoom lens according to the third embodiment;

DETAILED DESCRIPTION

Figure 1:
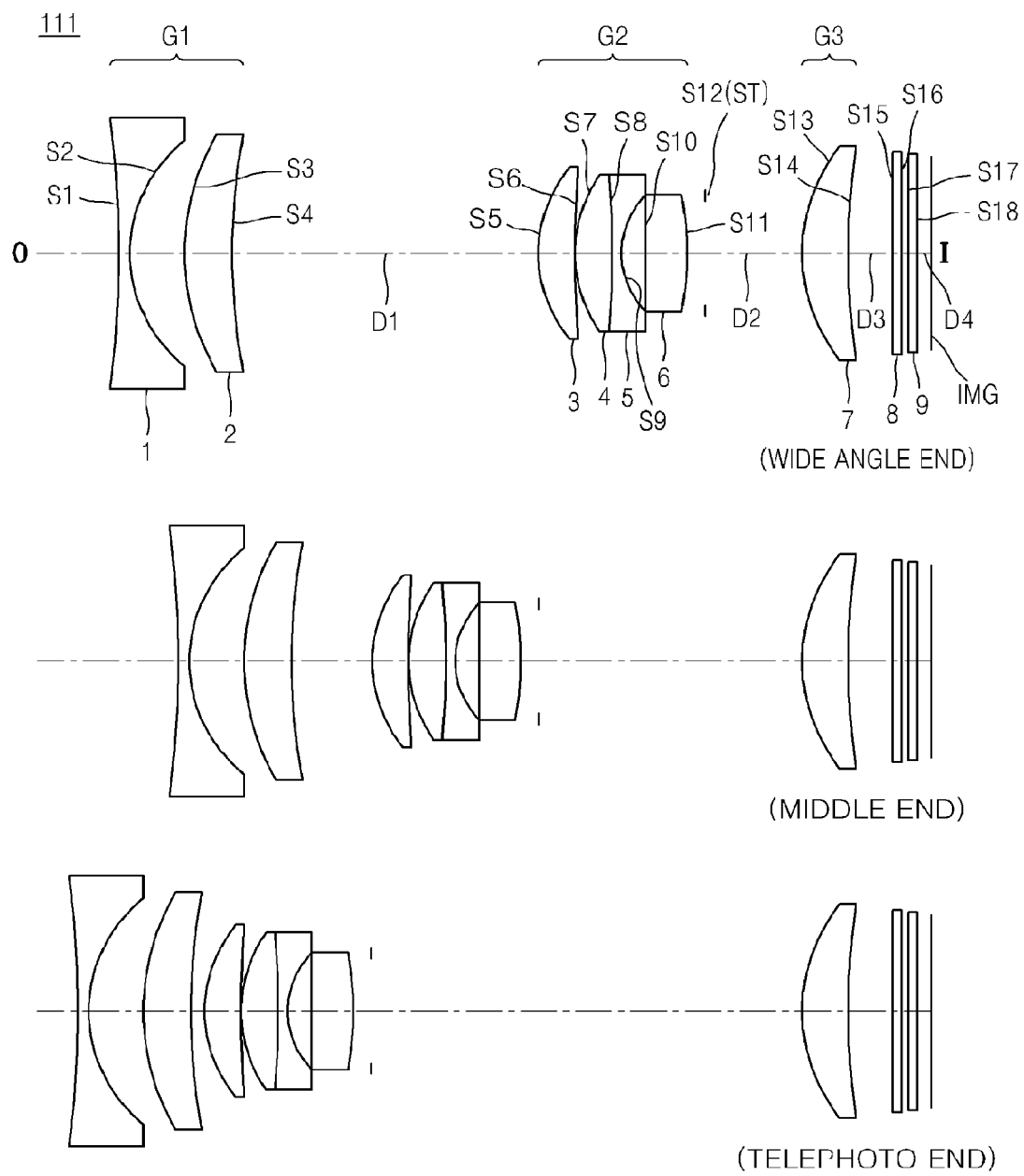
FIG. 1 illustrates a zoom lens at each of a wide angle position, a middle position, and a telephoto position according to a first embodiment.

Hereinafter, various embodiments will be described in detail with reference to the attached drawings. In the drawings, like reference numerals in the drawings denote like elements, and the size of each component may be exaggerated for clarity.

FIG. 1 illustrates a zoom lens 111 at each of a wide angle position, a middle position, and a telephoto position according to an embodiment of the invention.

Referring to FIG. 1, the zoom lens 111 includes a first lens group G1 having a negative refractive power, a second lens group G2 having a positive refractive power, and a third lens group G3 having a positive refractive power that are sequentially arranged from an object side O.

During zooming from the wide angle position to the telephoto position in the zoom lens 111, the distance between the first lens group G1 and the second lens group G2 may decrease, and the distance between the second lens group G2 and the third lens group G3 may increase.

The first lens group G1 may include a first lens 1 having a negative refractive power, and a second lens 2 having a positive refractive power that are sequentially arranged from the object side O. The first lens 1 may be a double-concave lens. The second lens group G2 may include a meniscus lens that has a concave surface toward the object side O and that is disposed closest to the image side I. Also, the second lens group G2 may include a meniscus lens having a convex surface toward the object side O. The meniscus lens having the convex surface toward the object side O may be formed as an aspherical lens.

Since the first lens group G1 has the aforementioned configuration, a wide angle lens having a wide view-angle, and a bright lens may be embodied. Also, since the second lens group G2 includes the meniscus lens that has the concave surface toward the object side and that is disposed closest to the image side, aberration due to a wide angle and aperture enlargement may be easily controlled. In order to increase the negative refractive power of the first lens group G1, it is necessary to increase the refractive power of each of the negative lens and the positive lens included in the first lens group G1. Thus, the lens of the first lens group G1 having the negative refractive power may be formed as a double-concave lens. Also, by allowing a lens disposed closest to the image side of the second lens group G2 to be formed as the meniscus lens having a positive refractive power and having the concave surface toward the object side, axial aberration and off-axis aberration may be controlled.

The second lens group G2 may include a third lens 3 having a positive refractive power, a fourth lens 4 having a positive refractive power, a fifth lens 5 having a negative refractive power, and a sixth lens 6 having a positive refractive power. For example, the third lens 3 may have a convex surface toward the object side O. Also, the third lens 3 may be a meniscus lens. The fourth lens 4 and the fifth lens 5 may be formed as a doublet lens. The sixth lens 6 may be a meniscus lens having the concave surface toward the object side O.

The second lens group G2 may include an aperture stop ST. For example, the aperture ST may be disposed closest to the object side O of the second lens group G2. Alternatively, the aperture ST may be disposed closest to the image side I of the second lens group G2. Since the lens of the second lens group G2, which is close to the aperture ST, is formed as an aspherical lens, spherical aberration may be easily corrected.

The third lens group G3 may include a seventh lens 7 having a positive refractive power. The seventh lens 7 may be an aspherical lens. The third lens group G3 may correct an image plane and may perform focusing. Since the seventh lens 7 is formed as an aspherical lens, aberration due to a wide angle and aperture enlargement may be easily corrected.

The seventh lens 7 may satisfy Equation 1 below.

$$60 \leq 3\,Vd \leq 100 \qquad \text{Equation 1}$$

where, 3 Vd indicates an Abbe's number of the seventh lens 7 included in the third lens group G3. Since the lens of the third lens group G3 is formed of a low dispersion material in the Abbe's number range of 60 through 100, an aberration change due to a chromatic aberration control and auto-focusing may be decreased.

The zoom lens 111 according to the present embodiment may satisfy Equation 2 below.

$$1.8 \leq |f1|/fw \leq 3 \qquad \text{Equation 2}$$

where, f1 indicates the focal length of the first lens group G1, and fw indicates the focal length of the zoom lens 111 at the wide angle position. If (|f1|/fw) exceeds the lower limit value of Equation 2, the refractive power highly increases, and the field curvature and distortion aberration at the wide angle position, and spherical aberration and coma aberration at the telephoto position increase, and it is difficult to correct these. If (|f1|/fw) exceeds the upper limit value of Equation 2, a disposition of a refractive power with a retro focus type becomes weak, and the power of the first lens group G1 is weak, so that it is difficult to assure a back focal length.

The zoom lens 111 may satisfy Equation 3 below.

$$-1 < (Ra+Rb)/(Ra-Rb) < 1 \qquad \text{Equation 3}$$

where, Ra indicates the radius of curvature of the object side O of the first lens 1 of the first lens group G1, and Rb indicates the radius of curvature of the image side of the second lens 2 of the first lens group G1.

By satisfying Equation 3, it is possible to embody the zoom lens 111 having a small-size. If (Ra+Rb)/(Ra−Rb) exceeds the lower limit value of Equation 3, the power of the first lens 1 (i.e., the negative lens) significantly increases such that it may be difficult to obtain a small-size and to maintain performance control. If (Ra+Rb)/(Ra−Rb) exceeds the upper limit value of Equation 3, the shape of the second lens 2 (i.e., the positive lens) is significantly changed such that it may be difficult to manufacture the lenses.

The zoom lens 111 may satisfy Equation 4 below.

$$3 \leq f3/fw \leq 6 \qquad \text{Equation 4}$$

where, f3 indicates the focal length of the third lens group G3, and fw indicates the focal length of the zoom lens 111 at the wide angle position.

If (f3/fw) exceeds the lower limit value of Equation 4, the refractive power of the third lens group G3 significantly increases, and the variation in aberration is increased when an image plane is corrected with respect to an object distance. If (f3/fw) exceeds the upper limit value of Equation 4, the distance in which the third lens group G3 has to move along the optical axis so as to correct the image plane is increased such that it may be difficult to achieve a small-size.

A refractive index of the second lens 2 (i.e., the positive lens) of the first lens group G1 may satisfy Equation 5 below.

$$1.9 \leq 1Nd \leq 2.099$$

where, 1 Nd indicates a d-line refractive index of the second lens 2 of the first lens group G1. Since the second lens 2 is formed of a material having a high refractive index equal to or greater than 1.9, the power of a lens is increased so that it is possible to achieve a small-size. In a case where the second lens 2 is formed of a material having a refractive index less than 1.9, the radius of curvature of the lens is sharply changed to maintain power, such that it may be difficult to process the lens.

The zoom lens 111 may satisfy Equation 6 below.

$$3 \leq ft/fw \leq 8 \qquad \text{Equation 6}$$

where, fw indicates the focal length of the zoom lens 111 at the wide angle position, and ft indicates the focal length of the zoom lens 111 at the telephoto position. By satisfying Equation 6, it is possible to realize good optical performance of the zoom lens 111 as a wide-angle and bright lens.

The zoom lens 111 may perform hand-shaking correction by moving the second lens group G2. For the hand-shaking correction, the second lens group G2 may perform a correction operation so that an image may have good quality and spherical aberration and a Petzval sum may be satisfactorily corrected when a lens is shifted. It is possible to suppress eccentric coma aberration occurring at a center of a screen when the second lens group G2 is vertically shifted with respect to an optical axis, and to correct spherical aberration. Also, since the Petzval sum is corrected, it is possible to suppress field curvature occurring around the screen when the second lens group G2 is vertically shifted with respect to the optical axis.

The second lens group G2 includes the aperture stop ST that may move together with the second lens group G2 during zooming. In this manner, since the aperture ST and the second lens group G2 move together, the structure for zooming may be simplified, and the size of a barrel may be decreased.

In the present embodiment, an aspherical surface is defined below.

An aspherical shape of a zoom lens according to the present embodiment may be defined by Equation 4 below, when an X-axis indicates an optical axis direction, a Y-axis indicates a direction perpendicular to the optical axis direction, and a forward direction of light is a positive direction. Here, x indicates the distance from a vertex of a lens in optical axis direction, y is a distance in a direction perpendicular to the optical axis, k is a conic constant, A, B, C, and D are aspherical coefficients, and c is the inverse (1/R) of the radius of curvature at the vertex of the lens.

$$x = \frac{cy^2}{1 + \sqrt{1 - (K+1)c^2 y^2}} + Ay^4 + By^6 + Cy^8 + Dy^{10} \qquad \text{Equation 7}$$

The zoom lens 111 may have a small-size and a wide-angle via embodiments according to various designs below.

Hereinafter, f indicates the focal length of a zoom lens, Fno indicates an F-number, 2ω indicates a viewing angle, R indicates the radius of curvature, Dn indicates a center thickness of a lens or a distance between lenses, Nd indicates a refractive index, and Vd indicates an Abbe's number. Also, ST indicates an aperture stop, D1, D2, D3, and D4 indicate variable lengths, and * indicates an aspherical lens. Also, in drawings associated with the embodiments, lenses that are comprised each lens group have the same reference numerals. A distance unit in the embodiments is in mm. Reference numerals 8 and 9 may indicate a filter or a cover glass.

First Embodiment

FIG. 1 illustrates a zoom lens at each of a wide angle position, a middle position, and a telephoto position according to a first embodiment. Table 1 below shows design data of the first embodiment. Although FIG. 1 illustrates reference numerals of lens surfaces of each lens, reference numerals of lens surfaces are omitted in drawings associated with other embodiments.

f; 5.05~11.24~17.60 (mm) Fno; 1.62~2.73~3.86 2ω; 85.86~45.39~29.89(°)

TABLE 1

| Lens surface | Radius of Curvature (R) | Thickness (Dn) | Refractive index (Nd) | Abbe's number (Vd) |
|---|---|---|---|---|
| S1* | −173.834 | 0.600 | 1.850 | 40.3 |
| S2* | 6.231 | 2.483 | | |
| S3 | 13.153 | 2.111 | 1.949 | 18.1 |
| S4 | 32.044 | D1 | | |
| S5* | 7.361 | 1.541 | 1.850 | 40.3 |
| S6* | 56.249 | 0.100 | | |
| S7 | 7.371 | 1.665 | 1.835 | 42.7 |
| S8 | −58.113 | 0.400 | 1.847 | 23.8 |
| S9 | 4.344 | 1.070 | | |
| S10 | −200.000 | 1.931 | 1.773 | 49.6 |
| S11 | −17.446 | 0.800 | | |
| S12 (ST) | infinity | D2 | | |
| S13* | 12.590 | 2.000 | 1.615 | 63.0 |
| S14* | −121.270 | D3 | | |

TABLE 1-continued

| Lens surface | Radius of Curvature (R) | Thickness (Dn) | Refractive index (Nd) | Abbe's number (Vd) |
|---|---|---|---|---|
| S15 | infinity | 0.300 | 1.517 | 64.1 |
| S16 | infinity | 0.300 | | |
| S17 | infinity | 0.500 | 1.517 | 64.1 |
| S18 | infinity | D4 | | |

Table 2 below shows data about aspherical coefficients of the zoom lens according to the first embodiment.

TABLE 2

| Lens surface | K | A | B | C | D |
|---|---|---|---|---|---|
| S1 | 0.000000 | −2.273676E−04 | 3.560362E−06 | −1.659369E−08 | −8.573975E−11 |
| S2 | −1.629364 | 1.657558E−04 | −4.487674E−06 | 2.310508E−07 | −3.032929E−09 |
| S5 | 0.520322 | −2.878789E−04 | −6.029086E−06 | −3.385077E−08 | 0.000000E+00 |
| S6 | 17.281424 | 1.222761E−04 | −3.486707E−07 | 1.295700E−07 | 0.000000E+00 |
| S13 | −1.000000 | 7.019866E−04 | −1.789419E−05 | 3.552762E−07 | 0.000000E+00 |
| S14 | −571246.314525 | 1.151314E−03 | −3.870158E−05 | 5.667392E−07 | 0.000000E+00 |

Table 3 below shows data about variable lengths during zooming.

TABLE 3

| Variable length | Wide angle position | Middle position | Telephoto position |
|---|---|---|---|
| D1 | 13.879 | 3.686 | 0.703 |
| D2 | 4.489 | 12.085 | 19.816 |
| D3 | 2.075 | 1.972 | 1.789 |
| D4 | 0.600 | 0.600 | 0.600 |

Figure 2B:
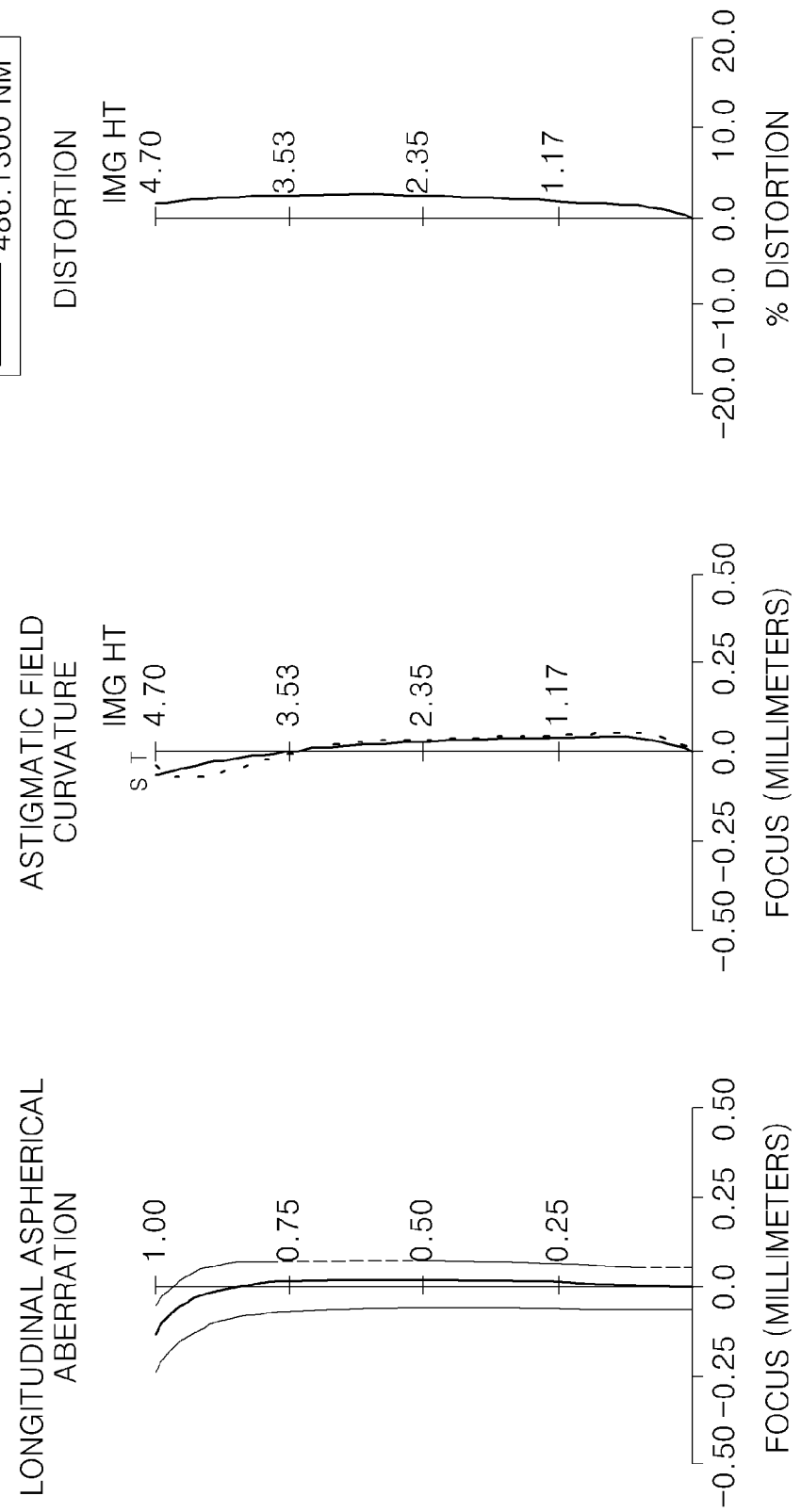

Each of FIGS. 2A and 2B illustrates spherical aberration, a field curvature, and distortion aberration at the wide angle position and the telephoto position of the zoom lens according to the first embodiment. A tangential field curvature and a sagittal field curvature are shown as the field curvature.

Second Embodiment

FIG. 3 illustrates a zoom lens according to a second embodiment. Table 4 below shows design data of the second embodiment.

f; 5.14~23.02~41.10 (mm) Fno; 2.31~5.35~8.94 2ω; 84.90~23.08~13.05(°)

TABLE 4

| Lens surface | Radius of Curvature (R) | Thickness (Dn) | Refractive index (Nd) | Abbe's number (Vd) |
|---|---|---|---|---|
| S1 | −42.759 | 1.374 | 1.842 | 37.0 |
| S2 | 7.253 | 2.256 | | |
| S3* | 18.664 | 1.506 | 2.099 | 16.8 |
| S4* | 49.953 | D1 | | |
| ST | infinity | 0.000 | | |
| S6* | 7.598 | 2.943 | 1.849 | 40.6 |
| S7* | 222.874 | 0.189 | | |
| S8 | 8.593 | 1.653 | 1.827 | 38.9 |
| S9 | −9.008 | 0.443 | 1.852 | 25.1 |
| S10 | 4.606 | 0.794 | | |
| S11 | −85.465 | 0.929 | 1.743 | 23.7 |
| S12 | −19.667 | D2 | | |
| S13 | 29.888 | 2.929 | 1.437 | 95.1 |
| S14 | −15.103 | D3 | | |
| S15 | infinity | 0.300 | 1.517 | 64.1 |
| S16 | infinity | 0.300 | | |
| S17 | infinity | 0.500 | 1.517 | 64.1 |
| S18 | infinity | D4 | | |

Table 5 below shows data about aspherical coefficients of the zoom lens according to the second embodiment.

TABLE 5

| Lens surface | K | A | B | C | D |
|---|---|---|---|---|---|
| S3 | −1.000000 | −2.336420E−04 | −3.728988E−07 | 8.637718E−08 | 0.000000E+00 |
| S4 | −1.000000 | −3.869736E−04 | 0.000000E+00 | 0.000000E+00 | 0.000000E+00 |
| S6 | −0.033128 | −1.267020E−04 | 3.553929E−06 | 7.936722E−08 | 4.259193E−09 |
| S7 | 2065.036257 | 1.709360E−04 | 4.598652E−06 | 3.698151E−07 | 0.000000E+00 |

Table 6 below shows data about variable lengths of the zoom lens during zooming according to the second embodiment.

TABLE 6

| Variable length | Wide angle position | Middle position | Telephoto position |
|---|---|---|---|
| D1 | 18.751 | 1.913 | 0.645 |
| D2 | 5.826 | 27.121 | 50.749 |
| D3 | 1.605 | 5.709 | 3.244 |
| D4 | 0.600 | 0.600 | 0.600 |

Figure 4A:
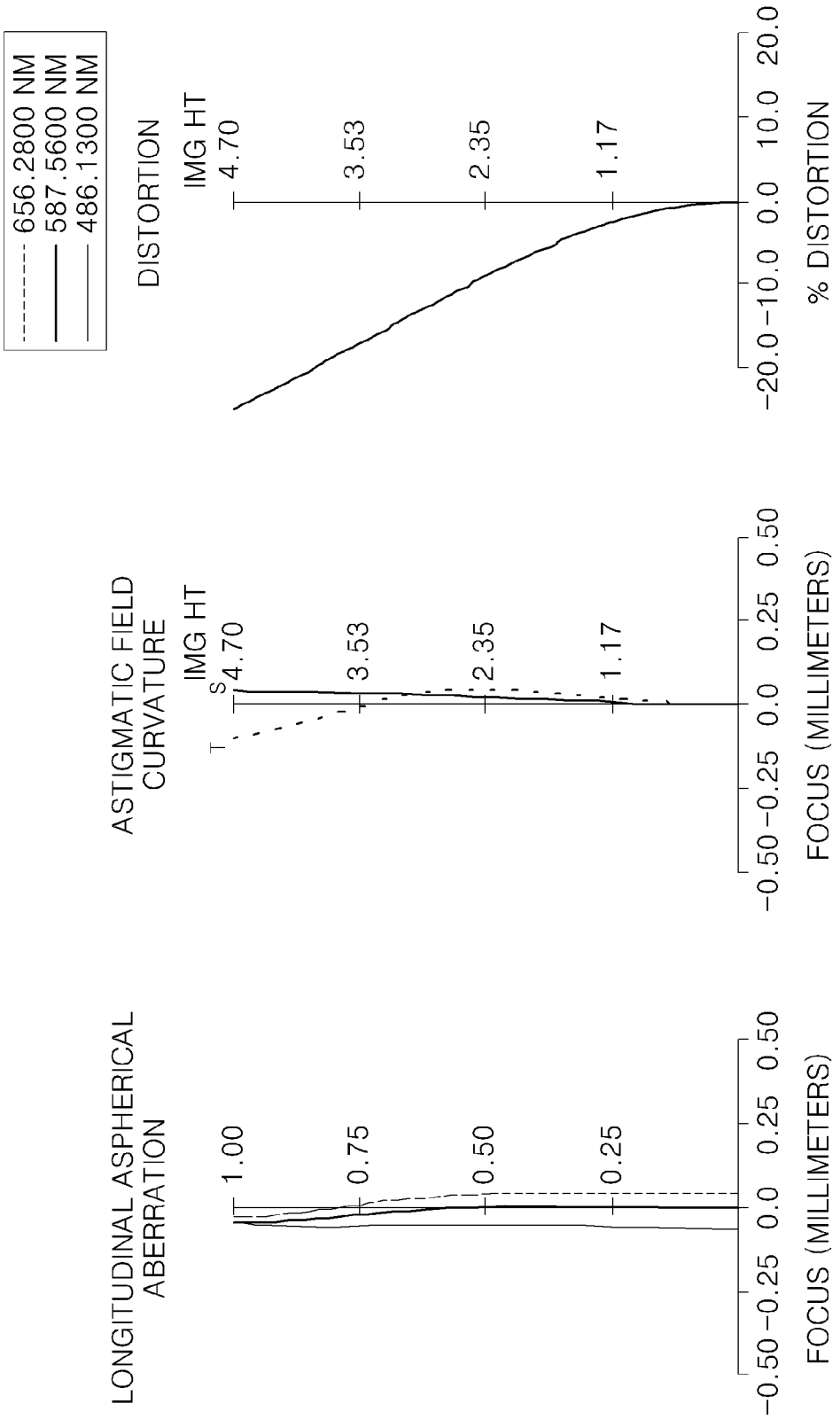

Each of FIGS. 4A and 4B illustrates spherical aberration, a field curvature, and distortion aberration at the wide angle position and the telephoto position of the zoom lens according to the second embodiment.

Third Embodiment

Figure 5:
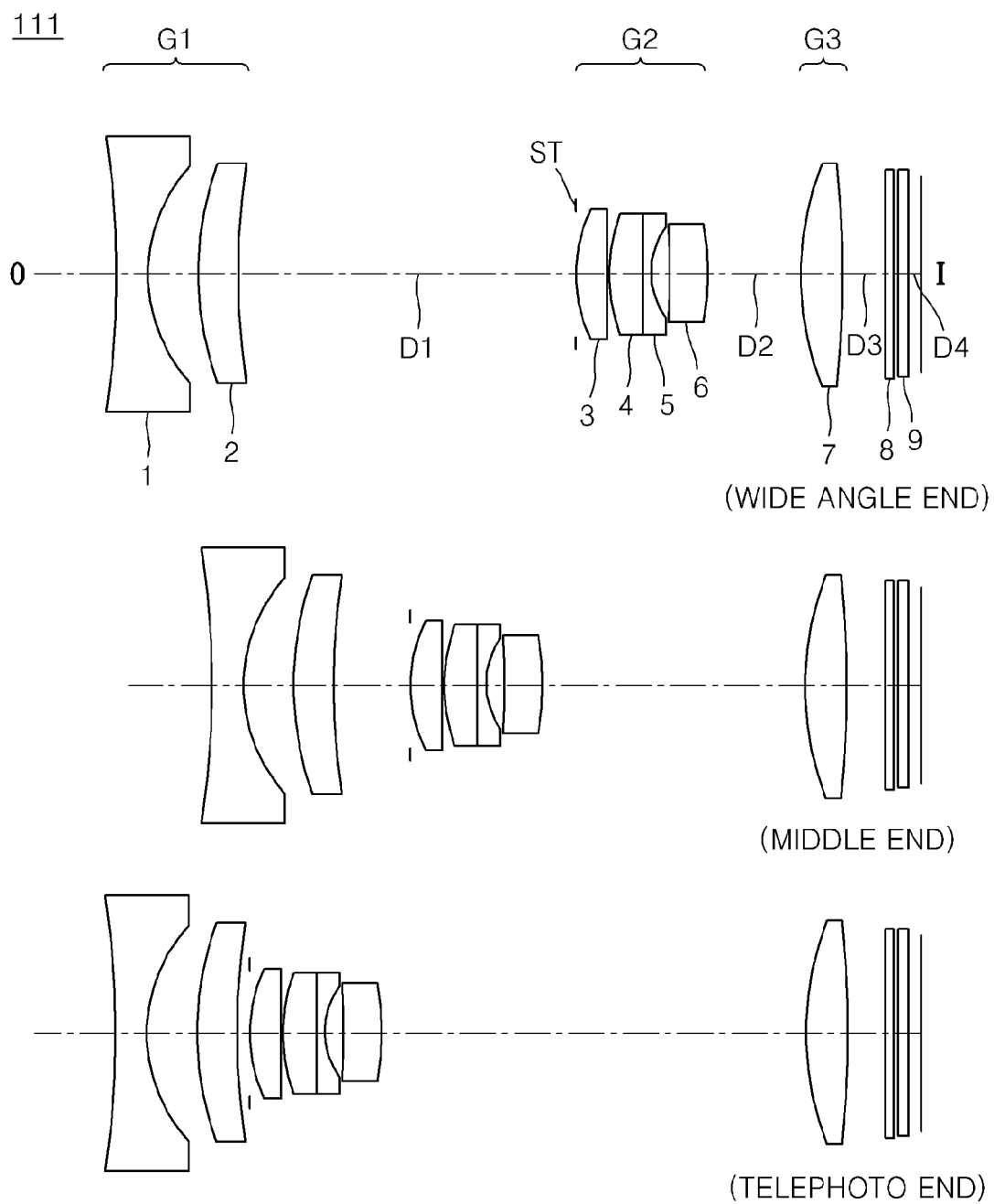
FIG. 5 illustrates a zoom lens at each of a wide angle position, a middle position, and a telephoto position according to a third embodiment.

FIG. 5 illustrates a zoom lens according to a third embodiment. Table 7 below shows design data of the third embodiment.

f; 4.33~10.85~17.36 (mm) Fno; 2.05~3.19~4.32 2ω; 94.63~46.82~30.29(°)

TABLE 7

| Lens surface | Radius of Curvature (R) | Thickness (Dn) | Refractive index (Nd) | Abbe's number (Vd) |
|---|---|---|---|---|
| S1* | −38.511 | 1.564 | 1.850 | 40.3 |
| S2* | 7.175 | 2.458 | | |
| S3* | 16.123 | 1.907 | 2.099 | 16.8 |
| S4 | 40.800 | D1 | | |
| ST | infinity | 0.000 | | |
| S6* | 7.301 | 1.436 | 1.850 | 40.3 |
| S7* | 200.000 | 0.100 | | |
| S8 | 8.144 | 1.664 | 1.836 | 37.8 |
| S9 | −109.835 | 0.411 | 1.846 | 20.5 |
| S10 | 4.452 | 0.887 | | |
| S11 | −43.761 | 1.846 | 1.775 | 33.5 |
| S12 | −14.640 | D2 | | |
| S13* | 14.230 | 2.000 | 1.619 | 63.9 |
| S14 | −58.568 | D3 | | |
| S15 | infinity | 0.300 | 1.517 | 64.1 |
| S16 | infinity | 0.300 | | |
| S17 | infinity | 0.500 | 1.517 | 64.1 |
| S18 | infinity | D4 | | |

Table 8 below shows data about aspherical coefficients of the zoom lens according to the third embodiment.

TABLE 8

| Lens surface | K | A | B | C | D |
|---|---|---|---|---|---|
| S1 | 6.342814 | 1.329494E−04 | −1.338794E−06 | 4.135658E−09 | 0.000000E+00 |
| S2 | −0.382267 | −4.932469E−05 | 3.352504E−06 | −1.314503E−07 | 0.000000E+00 |
| S3 | 0.000000 | 3.304800E−05 | 3.411151E−07 | 0.000000E+00 | 0.000000E+00 |
| S6 | 0.305551 | −3.868266E−04 | 2.388153E−06 | −7.704624E−07 | 0.000000E+00 |
| S7 | −3620.764400 | 8.257634E−05 | 3.027387E−06 | −6.353223E−07 | 0.000000E+00 |
| S13 | −14.769404 | 3.627904E−04 | −4.113933E−06 | 1.422054E−08 | 0.000000E+00 |

Table 9 below shows data about variable lengths of the zoom lens during zooming according to the third embodiment.

TABLE 9

| Variable length | Wide angle position | Middle position | Telephoto position |
|---|---|---|---|
| D1 | 16.278 | 3.822 | 0.666 |
| D2 | 4.541 | 12.637 | 20.446 |
| D3 | 2.122 | 1.916 | 1.860 |
| D4 | 0.600 | 0.600 | 0.600 |

Figure 6A:
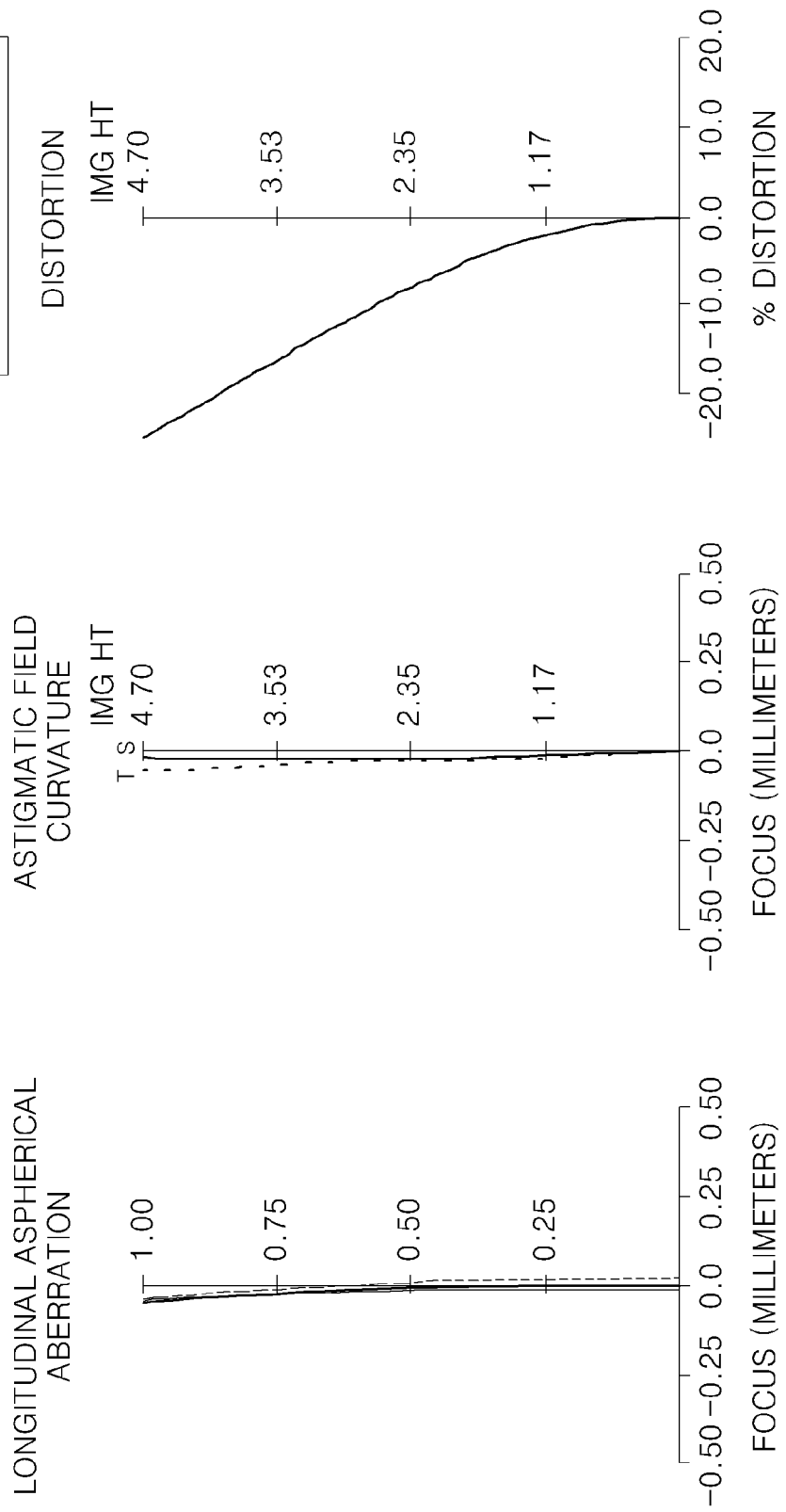

Each of FIGS. 6A and 6B illustrates spherical aberration, a field curvature, and distortion aberration at the wide angle position and the telephoto position of the zoom lens according to the third embodiment.

Fourth Embodiment

Figure 7:
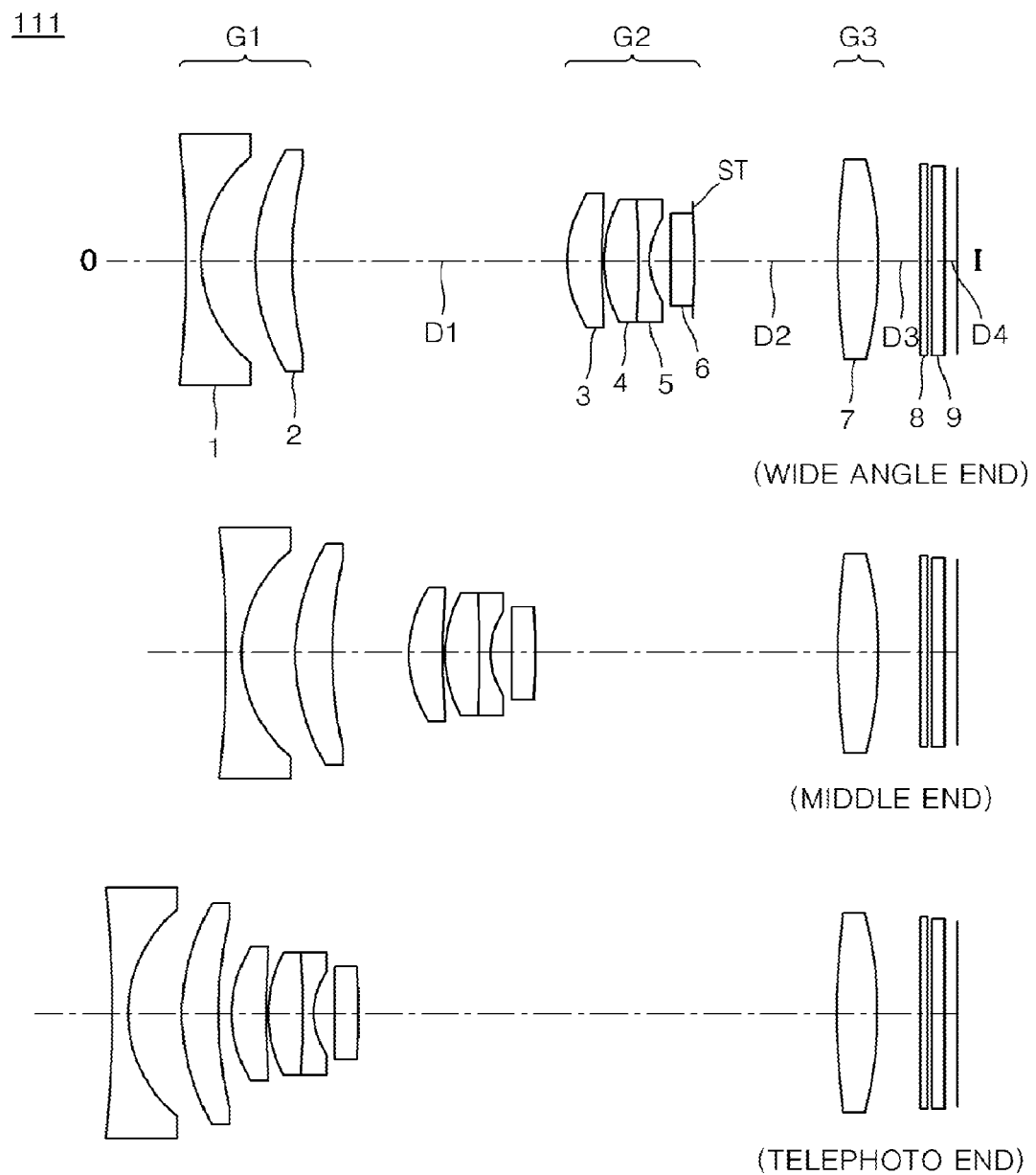
FIG. 7 illustrates a zoom lens at each of a wide angle position, a middle position, and a telephoto position according to a fourth embodiment.

FIG. 7 illustrates a zoom lens according to a fourth embodiment. Table 10 below shows design data of the fourth embodiment.

f; 5.69~12.18~19.45 (mm) Fno; 2.18~3.45~4.87 2ω; 79.08~42.18~27.18 (°)

TABLE 10

| Lens surface | Radius of Curvature (R) | Thickness (Dn) | Refractive index (Nd) | Abbe's number (Vd) |
|---|---|---|---|---|
| S1* | −140.006 | 0.750 | 1.850 | 40.3 |
| S2* | 6.283 | 2.471 | | |
| S3 | 11.715 | 1.748 | 1.946 | 18.0 |
| S4 | 24.668 | D1 | | |
| S5* | 7.380 | 1.560 | 1.850 | 40.3 |
| S6* | 46.639 | 0.100 | | |
| S7 | 7.125 | 1.659 | 1.835 | 42.7 |
| S8 | −50.924 | 0.403 | 1.847 | 23.8 |
| S9 | 4.265 | 1.085 | | |
| S10 | −112.901 | 1.169 | 1.773 | 49.6 |
| S11 | −15.540 | 0.000 | | |
| ST | infinite | D2 | | |
| S12* | 32.539 | 1.899 | 1.615 | 63.0 |
| S13* | −17.948 | D3 | | |
| S14 | infinity | 0.300 | 1.517 | 64.1 |
| S15 | infinity | 0.300 | | |
| S16 | infinity | 0.500 | 1.517 | 64.1 |
| S17 | infinity | D4 | | |

Table 11 below shows data about aspherical coefficients of the zoom lens according to the fourth embodiment.

TABLE 11

| Lens surface | K | A | B | C | D |
|---|---|---|---|---|---|
| S1 | 0.000000 | −1.446968E−04 | 4.274833E−06 | −5.273670E−08 | 2.289202E−10 |
| S2 | −1.527898 | 2.628748E−04 | −4.758290E−08 | 1.547397E−07 | −2.869772E−09 |
| S5 | 0.414369 | −2.855336E−04 | −3.227432E−07 | −2.054259E−07 | 0.000000E+00 |
| S6 | −0.955102 | 1.091341E−04 | 4.439138E−06 | −1.326903E−07 | 0.000000E+00 |
| S12 | −1.000000 | 2.174784E−04 | −1.445515E−05 | 1.067703E−07 | 0.000000E+00 |
| S13 | −29.350879 | −7.514735E−06 | −1.239198E−05 | 1.260150E−07 | 0.000000E+00 |

Table 12 below shows data about variable lengths of the zoom lens during zooming according to the fourth embodiment.

TABLE 12

| Variable length | Wide angle position | Middle position | Telephoto position |
|---|---|---|---|
| D1 | 12.987 | 3.710 | 0.673 |
| D2 | 6.628 | 14.013 | 22.277 |
| D3 | 2.000 | 2.000 | 2.000 |
| D4 | 0.600 | 0.600 | 0.600 |

Figure 8A:
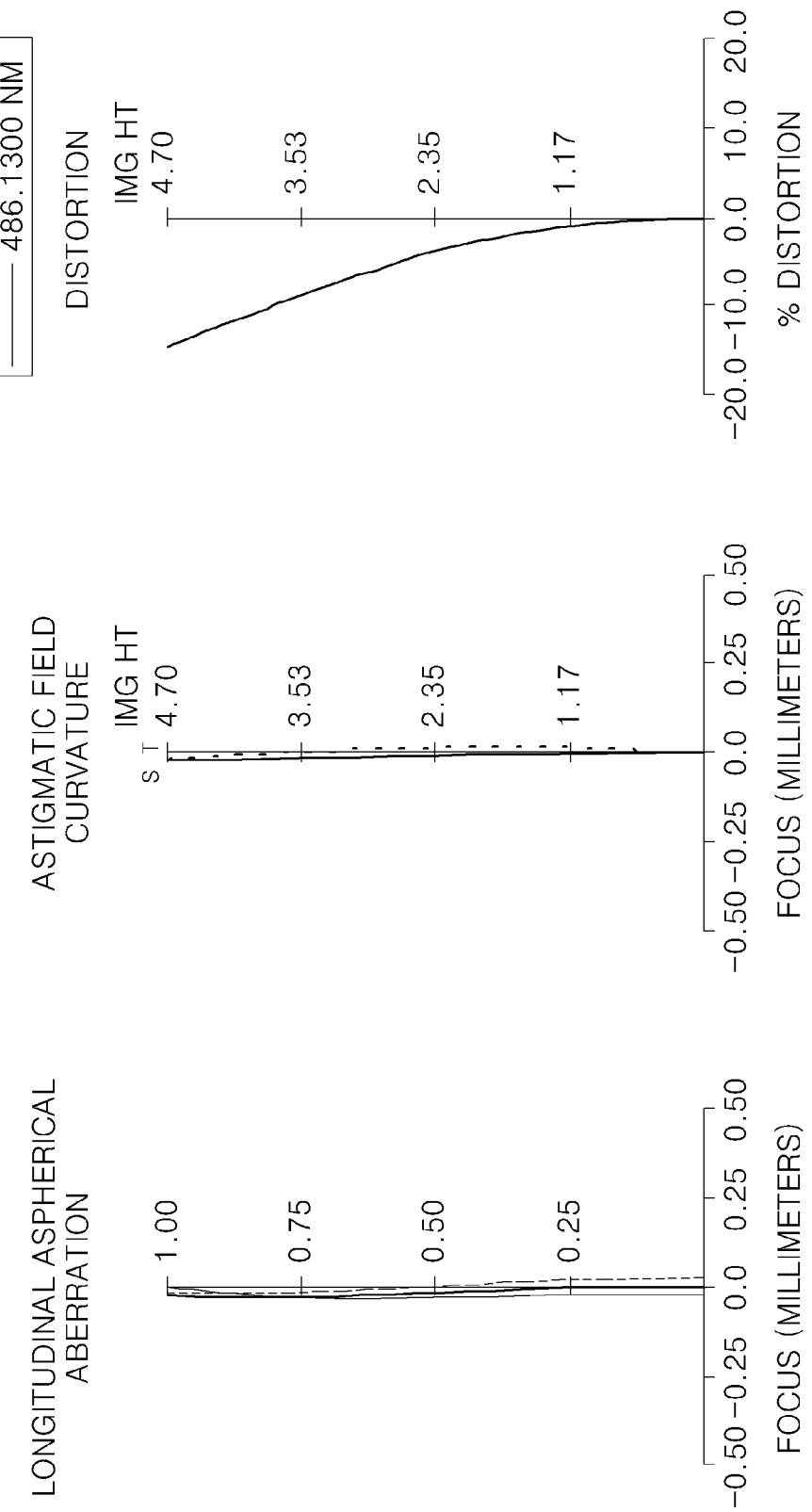
FIGS. 8A and 8B illustrate aberrations at the wide angle position and the telephoto position of the zoom lens according to the fourth embodiment.
Figure 8B:
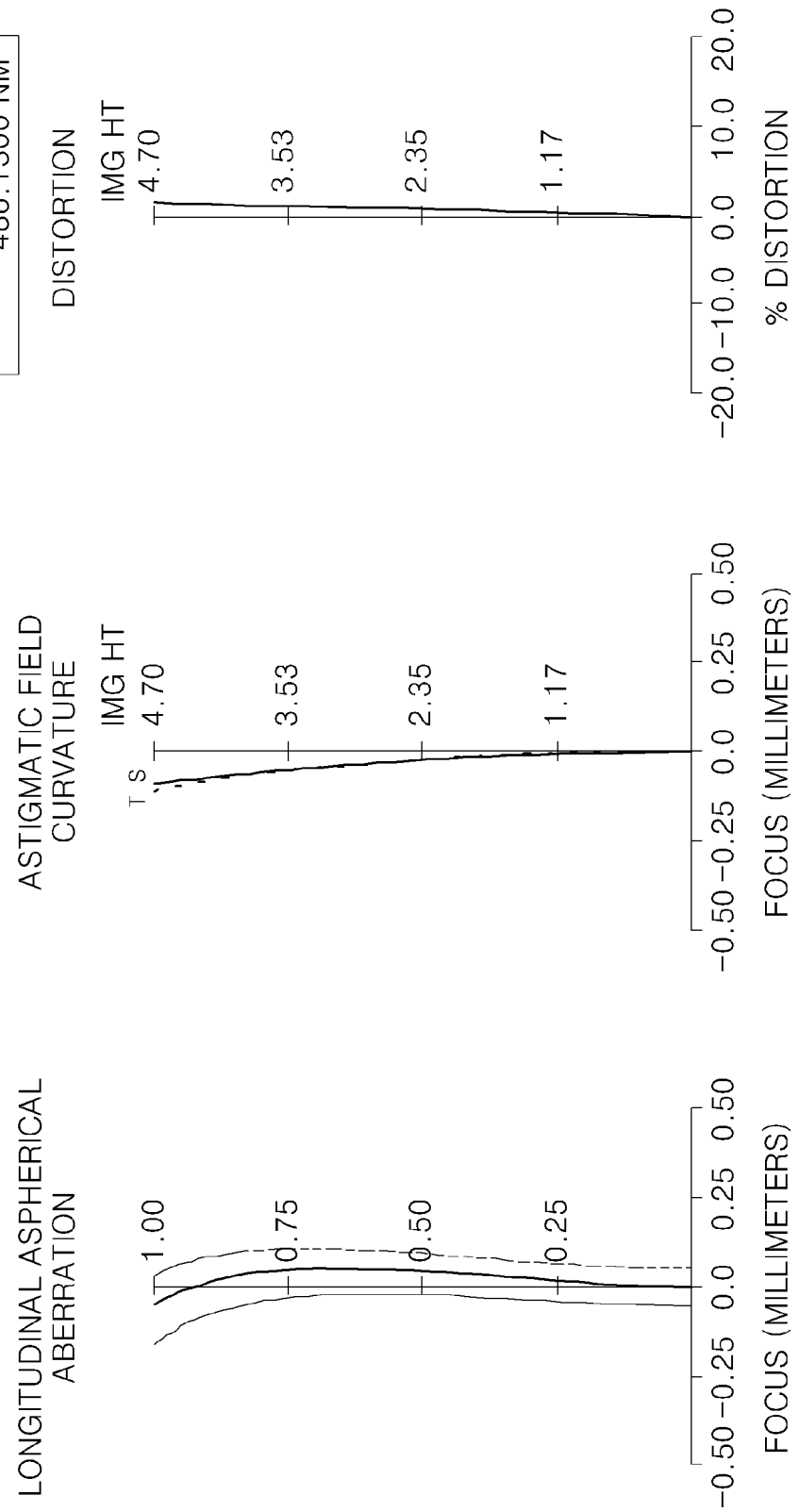

Each of FIGS. 8A and 8B illustrates spherical aberration, a field curvature, and distortion aberration at the wide angle position and the telephoto position of the zoom lens according to the fourth embodiment.

Table 13 shows that each of the first through fourth embodiments satisfies Equations 1 through 6.

TABLE 13

| Equation | | First embodiment | Second embodiment | Third embodiment | Fourth embodiment |
|---|---|---|---|---|---|
| Equation 1: | $60 \leq 3Vd \leq 100$ | 63.0 | 95.1 | 63.9 | 63.0 |
| Equation 2: | $1.8 \leq |f1|/fw \leq 3$ | 1.991 | 2.004 | 2.309 | 1.801 |
| Equation 3: | $-1 < (Ra + Rb)/(Ra - Rb) < 1$ | 0.689 | −0.078 | −0.029 | 0.700 |
| Equation 4: | $3 \leq f3/fw \leq 6$ | 3.891 | 5.101 | 4.996 | 4.937 |
| Equation 5: | $1.9 \leq 1Nd \leq 2.099$ | 1.949 | 2.099 | 2.099 | 1.946 |
| Equation 6: | $3 \leq ft/fw \leq 8$ | 3.49 | 8.00 | 4.01 | 3.42 |

The zoom lens according to the one or more embodiments has a high zooming rate, has a small-size, and realizes a bright lens. The zoom lens according to the one or more embodiments may be used in photographing apparatuses including a digital still camera, a single lens reflex camera, a video camera, a portable terminal, or the like which use a solid-state imaging device such as a charge coupled device (CCD) or a complementary metal-oxide semiconductor (CMOS).

Figure 9:
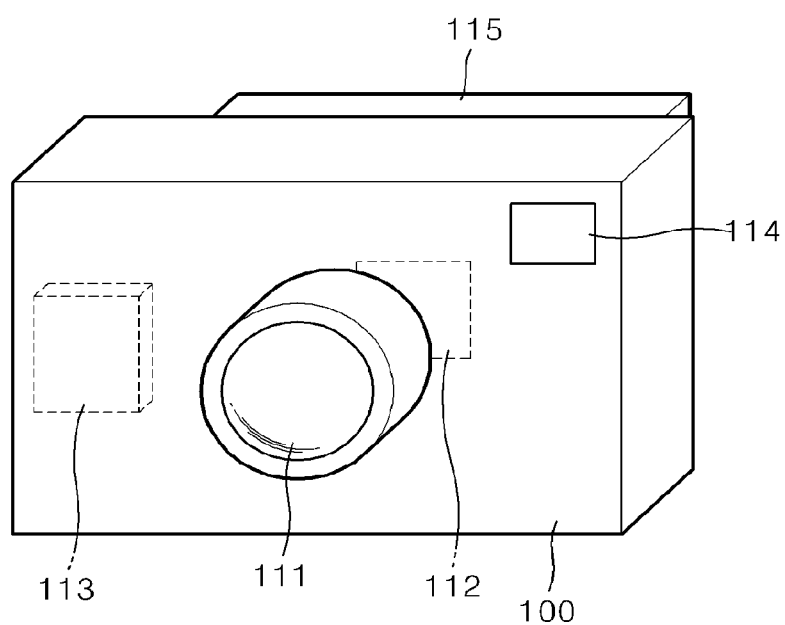
FIG. 9 is a diagram of a photographing apparatus, according to an embodiment of the invention.

FIG. 9 is a diagram of a photographing apparatus 100 including the zoom lens 111, according to an embodiment. The photographing apparatus 100 includes the zoom lens 111 according to the one or more embodiments, and an imaging device 112 for converting light, which is collected by the zoom lens 111, into an electrical image signal. The photographing apparatus 100 may include a recording means 113 and a viewfinder 114 for viewing a target object image, wherein information corresponding to the target object image that is photoelectrically converted by the imaging device 112 is recorded to the recording means 113. Also, the photographing apparatus 100 may include a display unit 115 for displaying the target object image. In the embodiment of FIG. 9, the viewfinder 114 and the display unit 115 are separately arranged, but only the display unit 115 may be arranged without the viewfinder 114. The photographing apparatus 100 of FIG. 9 is an example, and thus the one or more embodiments may be applied to various optical apparatuses other than a camera. As described above, by applying the zoom lens 111 to a photographing apparatus such as a digital camera, it is possible to provide an optical device having a small-size, a low cost, and a high zooming rate.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:
1. A zoom lens comprising:
   a first lens group having a negative refractive power, a second lens group having a positive refractive power, and a third lens group having a positive refractive power that are sequentially arranged from an object side,
   wherein during zooming from a wide angle position to a telephoto position, a distance between the first lens group and the second lens group decreases and a distance between the second lens group and the third lens group increases,
   the first lens group comprises a first lens having a negative refractive power and is a double-concave lens and a second lens having a positive refractive power that are sequentially arranged from the object side,
   the second lens group comprises an image-side lens having a positive refractive power, being disposed closest to an image side, and is a meniscus lens having a concave surface toward the object side, and
   the zoom lens satisfies the following Equations:

$$60 \leq 3Vd \leq 100$$

$$1.8 \leq |f1|/fw \leq 3$$

$$-1 < (Ra+Rb)/(Ra-Rb) < 1$$

where, 3Vd indicates an Abbe's number of a lens comprised in the third lens group, f1 indicates a focal length of the first lens group, fw indicates a focal length of the zoom lens at the wide angle position, Ra indicates a radius of curvature of an object side of the first lens, and Rb indicates a radius of curvature of an image side of the second lens.

2. The zoom lens of claim 1, wherein the zoom lens satisfies the following Equation:

$$3 \leq f3/fw \leq 6$$

where, f3 indicates a focal length of the third lens group.

3. The zoom lens of claim 1, wherein the refractive index of the second lens of the first lens group satisfies the following Equation:

$$1.9 \leq 1Nd \leq 2.099$$

where, 1Nd indicates a refractive index of the second lens of the first lens group.

4. The zoom lens of claim 1, wherein the zoom lens satisfies the following Equation:

$$3 \leq ft/fw \leq 8$$

where, ft indicates a focal length of the zoom lens at the telephoto position.

5. The zoom lens of claim 1, wherein the second lens group comprises a meniscus type aspherical lens having a convex surface toward the object side.

6. The zoom lens of claim 5, wherein the meniscus type aspherical lens that has the convex surface toward the object side has a positive refractive power.

7. The zoom lens of claim 1, wherein the second lens group comprises a doublet lens.

8. The zoom lens of claim 7, wherein the doublet lens comprises a positive lens and a negative lens that are sequentially arranged from the object side.

9. The zoom lens of claim 1, wherein the third lens group comprises an aspherical lens.

10. The zoom lens of claim 1, wherein the second lens group performs hand-shaking correction.

11. The zoom lens of claim 1, wherein the second lens group comprises an aperture stop disposed closest to the image side.

12. The zoom lens of claim 11, wherein the aperture stop moves together with the second lens group during zooming.

13. The zoom lens of claim 1, wherein the second lens group comprises an aperture stop disposed closest to the object side.

14. The zoom lens of claim 13, wherein the aperture stop moves together with the second lens group during zooming.

15. The zoom lens of claim 1, wherein the second lens group comprises, at the object side of the image-side lens, a third lens having a positive refractive power, a fourth lens having a positive refractive power, and a fifth lens having a negative refractive power, wherein the third, fourth, and fifth lenses are sequentially arranged from the object side.

16. The zoom lens of claim 1, wherein the third lens group performs focusing.

17. A photographing apparatus comprising:
a zoom lens; and
an imaging device for converting an image formed by the zoom lens into an electrical image signal,
wherein the zoom lens comprises a first lens group having a negative refractive power, a second lens group having a positive refractive power, and a third lens group having a positive refractive power that are sequentially arranged from an object side, wherein during zooming from a wide angle position to a telephoto position, a distance between the first lens group and the second lens group decreases and a distance between the second lens group and the third lens group increases, wherein the first lens group comprises a first lens having a negative refractive power and is a double-concave lens and a second lens having a positive refractive power that are sequentially arranged from the object side, wherein the second lens group comprises an image-side lens having a positive refractive power, being disposed closest to an image side, and is a meniscus lens having a concave surface toward the object side, and wherein the photographing apparatus satisfies the following Equations:

$$60 \leq 3Vd \leq 100$$

$$1.8 \leq |f1|/fw \leq 3$$

$$-1 < (Ra+Rb)/(Ra-Rb) < 1$$

where, 3Vd indicates an Abbe's number of a lens comprised in the third lens group, f1 indicates a focal length of the first lens group, fw indicates a focal length of the zoom lens at the wide angle position, Ra indicates a radius of curvature of an object side of the first lens, and Rb indicates a radius of curvature of an image side of the second lens.

18. The photographing apparatus of claim 17, wherein the photographing apparatus satisfies the following Equation:

$$3 \leq f3/fw \leq 6$$

where, f3 indicates a focal length of the third lens group.

19. The photographing apparatus of claim 17, wherein the refractive index of the second lens of the first lens group satisfies the following Equation:

$$1.9 \leq 1Nd \leq 2.099$$

where, 1Nd indicates a refractive index of the second lens of the first lens group.

20. The photographing apparatus of claim 17, wherein the photographing apparatus satisfies the following Equation:

$$3 \leq ft/fw \leq 8$$

where, ft indicates a focal length of the zoom lens at the telephoto position.

* * * * *